United States Patent
Yoshida et al.

(10) Patent No.: US 9,749,079 B2
(45) Date of Patent: Aug. 29, 2017

(54) OPTICAL SYSTEM, AND DYNAMIC WAVELENGTH BANDWIDTH ALLOCATION METHOD FOR OPTICAL SYSTEM

(71) Applicant: NIPPON TELEGRAPH AND TELEPHONE CORPORATION, Chiyoda-ku, Tokyo (JP)

(72) Inventors: Tomoaki Yoshida, Yokosuka (JP); Shinya Tamaki, Yokosuka (JP); Shin Kaneko, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 93 days.

(21) Appl. No.: 14/655,310

(22) PCT Filed: Dec. 6, 2013

(86) PCT No.: PCT/JP2013/082815
§ 371 (c)(1),
(2) Date: Jun. 24, 2015

(87) PCT Pub. No.: WO2014/115429
PCT Pub. Date: Jul. 31, 2014

(65) Prior Publication Data
US 2015/0326337 A1    Nov. 12, 2015

(30) Foreign Application Priority Data
Jan. 24, 2013  (JP) .................. 2013-011069

(51) Int. Cl.
*H04J 14/00*  (2006.01)
*H04J 14/02*  (2006.01)
(Continued)

(52) U.S. Cl.
CPC ...... *H04J 14/0247* (2013.01); *H04J 14/0252* (2013.01); *H04L 12/44* (2013.01);
(Continued)

(58) Field of Classification Search
CPC ............ H04J 14/0238; H04J 14/0227; H04J 14/0228; H04J 14/0246; H04J 14/0247;
(Continued)

(56) References Cited

U.S. PATENT DOCUMENTS

| | | | |
|---|---|---|---|
| 2007/0092256 A1* | 4/2007 | Nozue | H04J 14/0282 398/72 |
| 2013/0004172 A1* | 1/2013 | Sugawa | H04J 3/1694 398/72 |
| 2013/0236170 A1 | 9/2013 | Nishitani et al. | |

FOREIGN PATENT DOCUMENTS

| | | |
|---|---|---|
| CN | 101944966 A | 1/2011 |
| JP | 200387281 | 3/2003 |
| JP | 200743270 | 2/2007 |
| JP | 2011147023 | 7/2011 |
| WO | 2012/070127 A1 | 5/2012 |

OTHER PUBLICATIONS

Hirotaka Nakamura, et al., "40G bit/s -tunable stacked-WDM/TDM-PON using dynamic wavelength and bandwidth allocation", OThT4, OSA/OFC/NFOEC2011.
(Continued)

*Primary Examiner* — Hanh Phan
(74) *Attorney, Agent, or Firm* — Ohlandt, Greeley, Ruggiero & Perle, L.L.P.

(57) ABSTRACT

An ONU requests a bandwidth of an uplink signal, and in accordance with this, an OLT calculates a time when the OLT transmits the uplink signal and a transmission duration time and performs an instruction, and a DBA cycle in which the ONU transmits the uplink signal in accordance with the instruction and a dynamic wavelength allocation cycle in which the OLT instructs wavelength switching, and the
(Continued)

ONU switches the wavelength and belongs to a different LC are separated. While the ONU switches the wavelength, the DBA cycles can be performed plural times in the ONU whose wavelength is not switched, the switching of the wavelength is confirmed after the wavelength has been switched, and then DBA operation is performed at the switched wavelength.

15 Claims, 6 Drawing Sheets

(51) Int. Cl.
    *H04Q 11/00*     (2006.01)
    *H04L 12/44*     (2006.01)
    *H04L 12/64*     (2006.01)

(52) U.S. Cl.
    CPC ..... *H04L 12/6418* (2013.01); *H04Q 11/0067* (2013.01); *H04Q 2011/0016* (2013.01); *H04Q 2011/0086* (2013.01)

(58) Field of Classification Search
    CPC .. H04J 14/025; H04J 14/0252; H04B 10/272; H04Q 11/0067; H04Q 11/0005
    USPC ........ 398/66, 67, 68, 69, 70, 71, 72, 74, 75, 398/79, 98, 99, 100, 135, 45, 48, 49, 58; 370/352, 392, 389, 468, 465
    See application file for complete search history.

(56) References Cited

OTHER PUBLICATIONS

Michael P. McGarry et al., "An evolutionary WDM upgrade for EPONs", Communications Magazine, IEEE, vol. 44, No. 2, pp. 15-22, 2006.

Tsutomu Tatsuta et al., "Design philosophy and performance of a GE-PON system for mass development", Journal of Optical Networking, vol. 6, No. 6, pp. 689-700, 2007.

Kenji Sato et al., "Wideband External Cavity Wavelength-Tunable Laser Utilizing a Liquid-Crystal-Based Mirror and an Intracavity Etalon", Journal of Lightwave Technology, IEEE, vol. 25, No. 8, pp. 2226-2232, 2007.

Hirotaka Nakamura et al, "-tunable WDM/TDM-PON using DWBA for flexible service upgrade", 2010 Nen IEICE Communication Society Conference, Aug. 31, 2010, p. 227 (B-10-40).

Michael P. McGarry et al, "WDM Ethernet Passive Optical Networks", IEEE Optical Communications, Feb. 2006.

Part 3: Carrier Sense Multiple Access with Collision Detection(CSMA/CD) access method and Physical Layer specifications, IEEE Standard802.3-2008.

International Search Report dated Jan. 14, 2014 corresponding to International PCT Application No. PCT/JP2013/082815; 2 pages.

International Preliminary Report on Patentability dated Aug. 6, 2015 from corresponding International Application No. PCT/JP2013/082815, 6 pages.

Chinese Office Action dated Jun. 2, 2017 from corresponding Chinese Patent Application No. 201380070958.1, 16 pages.

\* cited by examiner

OPTICAL SYSTEM, AND DYNAMIC WAVELENGTH BANDWIDTH ALLOCATION METHOD FOR OPTICAL SYSTEM

BACKGROUND

1. Field of the Disclosure

The present disclosure relates to a wavelength and bandwidth of allocation method in PON (Passive Optical Networks) in which wavelength multiplexing and time division multiplexing are combined.

2. Discussion of the Background Art

Along with the recent rapid spread of the Internet, an access service system is required to be increased in capacity, advanced, and economized, and meanwhile, PON has been investigated as a means for realizing that. The PON is an optical communication system in which one station-side apparatus and a portion of a transmission path are shared by a plurality of subscriber apparatuses, using an optical multiplexer/demultiplexer using an optical passive element, to contribute to economization (for example, see Patent Literature 1).

Currently, in Japan, an economic optical system, GE-PON (Gigabit Ethernet™ Passive Optical Network) in which a circuit capacity of 1 Gbps is shared by up to 32 users with time division multiplexing (TDM) is mainly introduced, whereby an FTTH (Fiber To The Home) service is provided at a realistic price.

In order to respond to the needs of a larger capacity, 10 G-EPON with a total band of 10 Gbps class has been investigated as a next-generation optical system, and international standardization has been completed in 2009. This is an optical system in which an increase in capacity is realized by increasing the bit rate of a transceiver, while using a transmission path portion, such as an optical fiber, which is the same as that of the GE-PON.

In future, although it is considered that an ultra-high definition video service, a ubiquitous service, and so on are required to have a large capacity of more than 10 G class, when the bit rate of the transceiver is merely increased from 10 G class to 40/100 G class, there is a problem that the practical application is difficult due to an increase in cost required for system upgrade.

As a means for solving the above problem, there has been reported a wavelength tunable WDM/TDM-PON in which wavelength tunability is added to a transceiver in a station-side apparatus so that the transceiver can be increased in a stepwise manner, according to a bandwidth request amount, and time division multiplexing (TDM) and wavelength division multiplexing (WDM) are combined effectively (for example, see Non Patent Literature 1).

CITATION LIST

Patent Literature

[Patent Literature 1]
JP 2003-87281 A

Non Patent Literature

[Non Patent Literature 1]
Hirotaka NAKAMURA, et al., "40 G bit/s λ-tunable stacked-WDM/TDM-PON using dynamic wavelength and bandwidth allocation", OThT4, OSA/OFC/NFOEC2011, 2011.

[Non Patent Literature 2]
Michael P. McGarry et al., "An evolutionary WDM upgrade for EPONs", Communications Magazine, IEEE, vol. 44, No. 2, pp. 15-22, 2006

[Non Patent Literature 3]
Tsutomu Tatsuta et al., "Design philosophy and performance of a GE-PON system for mass deployment", Journal of Optical Networking, vol. 6, No. 6, pp. 689-700, 2007

[Non Patent Literature 4]
Kenji Sato et al., "Wideband External Cavity Wavelength-Tunable Laser Utilizing a Liquid-Crystal-Based Mirror and an Intracavity Etalon", Journal of Lightwave Technology, IEEE, Vol. 25, No. 8, pp. 2226-2232, 2007

SUMMARY

When such wavelength tunable WDM/TDM-PON is operated, in order to efficiently distribute a total bandwidth of a system, and particularly a total uplink bandwidth, to subscriber apparatuses (ONUs: Optical Network Units), an algorithm that dynamically allocates wavelength and bandwidth is required, and as methods therefor, some methods have been already reported (for example, see Non Patent Literature 2).

Meanwhile, as an uplink signal multiplexing method, used in the related art GE-PON, with high bandwidth utilization efficiency and less delay, there is a dynamic bandwidth allocation (DBA) method as shown in Non Patent Literatures 3 and 1. This method is temporarily referred to as a multiple request method. In this method, a station-side apparatus (OLT: Optical Line Terminal) collects bandwidths required by ONUs within a fixed cycle, and it is assured that based on the information, a minimum of uplink signal transmission permission is inevitably given to the ONUs, and namely an uplink bandwidth is allocated to each of the ONUs. Thus, this method is characterized in that when the ONU requires the bandwidth for each fixed cycle, a waiting time till when transmission permission is given, that is, a delay time is less than the fixed cycle.

Information of all the ONUs requiring transmission permission of an uplink signal is collected, and uplink signal transmission permission is given to the ONUs; therefore, an uplink bandwidth is efficiently and fairly allocated to each of the ONUs. Here, while uplink means a direction from the ONU to the OLT, downlink means a direction from the OLT to the ONU.

Figure 1:
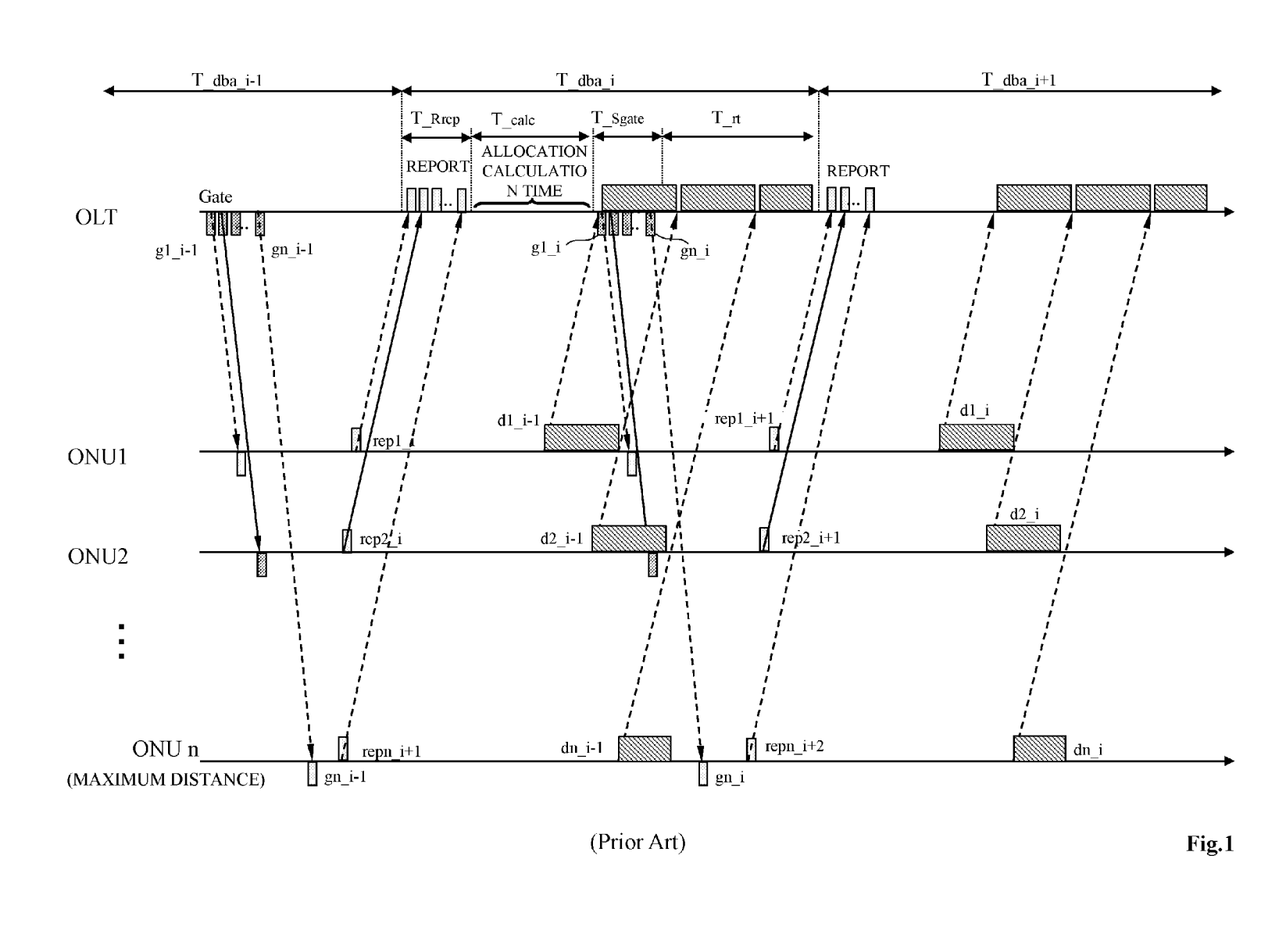
FIG. 1 is an uplink signal transmission sequence using a DBA in the related art TDM-PON.

Uplink bandwidth control using a DBA algorithm carried out at a fixed period and used in the multiple request method will be described using FIG. 1. In FIG. 1, the horizontal axis represents time, and FIG. 1 shows a state in which a control signal and an uplink signal are transmitted between an OLT and an ONU1 to an ONUn. In the arrows indicating time axes of the OLT and the ONUs, the upper side indicates a timing of an uplink signal, and the lower side indicates a timing of a downlink signal. Namely, in the OLT, the upper side indicates a timing of a reception signal, and the lower side indicates a timing of a transmission signal. In the ONU, the lower side indicates the timing of the reception signal, and the upper side indicates the timing of the transmission signal.

A signal transmitted from the OLT is received by the ONU through an optical fiber. The ONUn is the ONU farthest from the OLT in a PON topology. In the arrows indicating the time axis of the ONU, a signal transmission timing is shown on the upper side, and a signal reception timing is shown on the lower side. In an i-th cycle of a DBA, the time of one cycle is represented by T_dba_i, and its value is fixed.

Next, operation for the OLT to control the uplink bandwidth of the ONU will be described. The OLT transmits a GATE signal instructing a transmission start time and a transmission duration time of a Report signal and an uplink signal to each of the ONUs. The GATE signal with a cycle I transmitted to the ONUn is represented by gn_i. When receiving g1_$i$–1 to gn_i–1, the ONUs transmit a data amount of a buffer for uplink signal, accumulated in the ONU, as Report signals rep1_$i$ to repn_i to the OLT at the time instructed by the GATE signal and thereby make a report to the OLT. The time when the Report signal is transmitted to the OLT is instructed by gn_i–1. The OLT instructs the time of transmission of the Report signals, instructed by g1_$i$–1 to gn_i–1, in consideration of a propagation time to prevent these Report signals from colliding with each other. A time of an uplink signal and the data amount are instructed by gn_i–1, and an uplink signal dn_i–1 is transmitted to the OLT at a designated time.

The OLT calculates such allocation that the ONUs transmit uplink signals d1_$i$ to dn_i at which time and for how much time, in accordance with transmission requests included in the Report signals (rep1_$i$ to repn_i) received from each of the ONUs. Further, the OLT calculates the time of transmission of Report signals (rep1_$i$+1 to repn_i+1) in the next cycle. The GATE signals (g1_$i$ to gn_i) including the calculation results are transmitted to the ONUs. The ONUs which have received g1_$i$ to gn_i generate the Report signals rep1_$i$+1 to repn_i+n again to transmit the Report signals to the OLT, and, thus, to transmit the uplink signals d1_$i$ to dn_i at designated times.

As described above, the OLT collects bandwidth information required by each of the ONUs to calculate the uplink signal transmission start time and the transmission duration time, and, thus, to give the ONUs instruction. Since each of the ONUs transmits the uplink signal in accordance with the instruction, the uplink signals are not interfered with in a shared optical fiber of PON, and, in addition, a flexible bandwidth corresponding to a request from the ONU is allocated, so that high efficient uplink communication is realized.

The DBA repeats such a cycle that the OLT transmits the GATE signal, the ONU which has received the GATE signal transmits the Report signal and the uplink signal, the OLT which has received the Report signal and the uplink signal calculates an allocation time and a transmission data amount and instructs each of the ONUs to transmit the next Report signal and uplink signal through the transmission of the GATE signal. The cycle T_dba is represented by T_dba=T_Rrep+T_calc+T_Sgate+T_rt, where T_Rrep is a reception time of Report, T_calc is a time when allocation of an uplink signal to the ONU is calculated, T_Sgate is a time when the GATE signal is transmitted to the ONU, the GATE signal propagates, the ONU receives the GATE signal to generate the Report signal and transmits the Report signal to the OLT, and T_rt is a returning time immediately before the OLT receives the Report signal.

In the above-described multiple request method as the DBA described in the Non Patent Literatures 3 and 1, a single uplink wavelength is assumed, and use of a plurality of wavelengths is not assumed.

Accordingly, when it is assumed that the DBA is applied to wavelength tunable WDM/TDM-PON, in addition to dynamic bandwidth allocation performed by the OLT, schemes of dynamic wavelength allocation in which a wavelength is allocated dynamically are added, and control assuming that the ONU switches a wavelength of an uplink signal is newly required.

Judgment whether the wavelength of the ONU is switched can be realized by providing such conditions that the OLT receives the Report signal from each of the ONUs, for example, a total of a required bandwidth from the ONU accommodated in a certain uplink signal wavelength (here, $\lambda 1$) is more than the uplink bandwidth of the wavelength, and the uplink bandwidth of another uplink signal wavelength (here, $\lambda 2$) has a free bandwidth enough to receive the required bandwidth.

Figure 2:
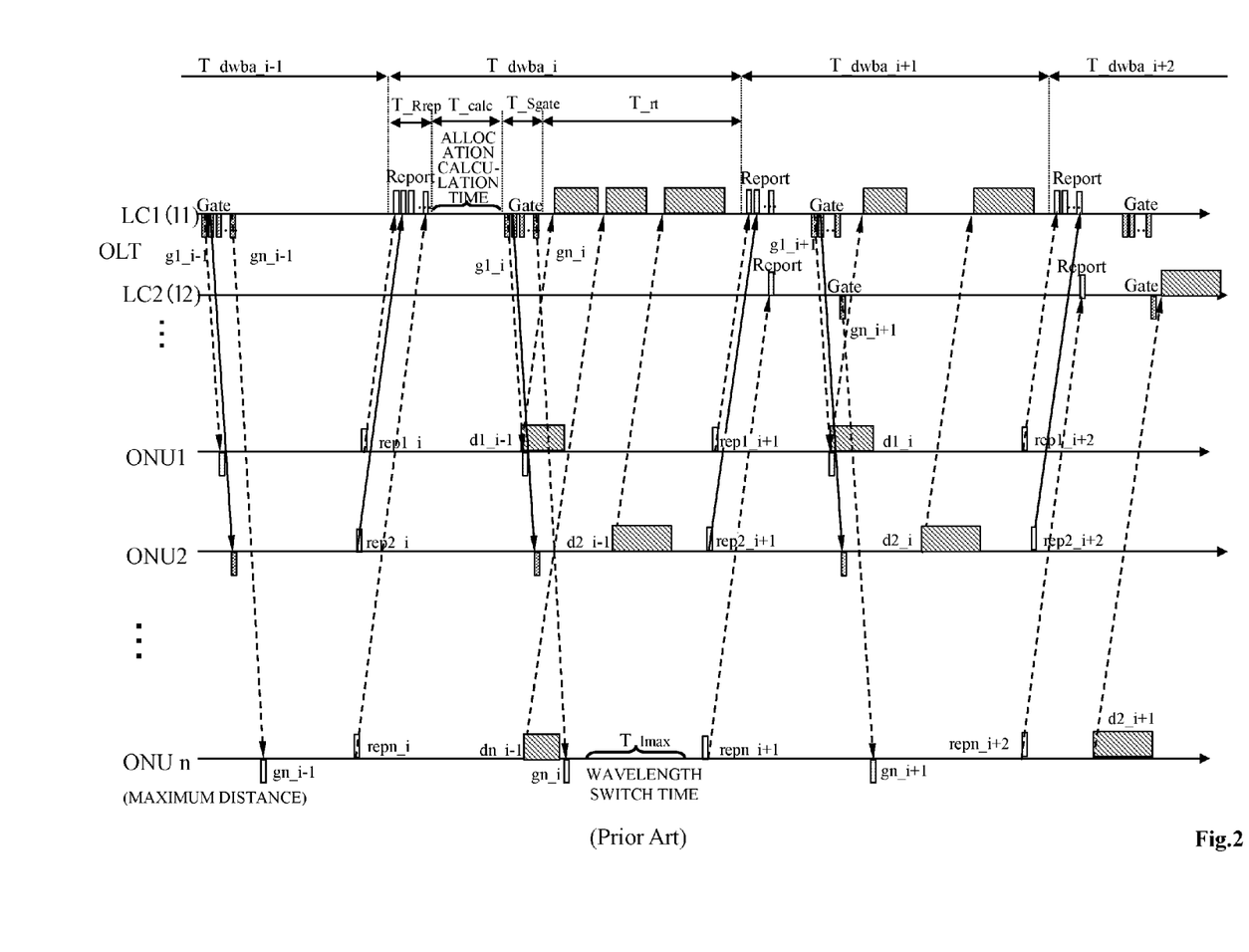
FIG. 2 is an uplink signal transmission sequence in which the related art DBA is applied to wavelength tunable WDM/TDM-PON.

FIG. 2 shows operation of dynamic wavelength and bandwidth allocation (DWBA) including wavelength switching instruction. The used terms and the configuration of the drawing are similar to those in FIG. 1. In FIG. 2, an i-th DWBA cycle is represented by T_dwba_i.

The OLT has transceivers corresponding to transmitted and received wavelengths. A portion in which the transceivers corresponding to the wavelengths are mounted is represented by LC (Line Card). When line cards LC1 to LCm are incorporated into the OLT, the number of the transmitted wavelengths is m, and the number of the received wavelengths is also m. An uplink signal wavelength received by the LC1 is represented by $\lambda 1$, and the uplink signal wavelength received by the subsequent LCm is represented by $\lambda m$. When different wavelengths are used in uplink and downlink, the number of the wavelength is 2 m in total, and when the same wavelength is used, the number of the wavelength is m in total.

Next, operation for the OLT to control an uplink transmission time and a bandwidth wavelength of the ONU will be described.

The OLT transmits a Gate signal, instructing a transmission start time and a transmission duration time of a Report signal and an uplink signal, to each of the ONUs. When receiving g1_$i$–1 to gn_i–1, the ONU requests, as the Report signals rep1_$i$ to repn_i, a bandwidth, required for the ONU to transmit an uplink signal, to the OLT at the time instructed by the Gate signal. The time when the Report signal instructed by the OLT is transmitted is calculated in consideration of a propagation time to prevent these Report signals from being superimposed and colliding with the OLT. In the Gate signal, the transmission time and the transmission duration time of the uplink signal are designated by g1_$i$–1 to gn_i–1, and the uplink signals d1_$i$–1 to dn_i–1 are transmitted to the OLT at a designated time.

The OLT calculates that the uplink signals d1_$i$–1 to dn_i–1 of the ONUs transmit at which time, for how much time, and at which wavelength in accordance with requests included in the Report signals rep1_$i$ to repn_i received from each of the ONUs.

FIG. 2 shows an example in which calculation is performed so that the uplink signal wavelength of the ONUn is changed from $\lambda 1$ to $\lambda 2$ in the cycle T_dwba_i. At this time, gn_i as the Gate signal to the ONUn includes an instruction that the wavelength is changed to $\lambda 2$.

The transmission time and the transmission duration time of the Report signals rep1_$i$+1 to repn_i+1 in the next cycle are calculated, and the calculation results are included in the Gate signals g1_$i$ to gn_i and transmitted to each of the ONUs. The time when the Report signal is transmitted is calculated and designated so that all the ONUs can transmit signals in consideration that no signal can be transmitted during switching of the wavelength of the ONUn. In particular, repn_i+1 should be a time that prevents collision with the signal of the ONU subordinate to the LC at $\lambda 2$ that is the wavelength after switching. The ONUn which has received gn_i switches the wavelength to $\lambda 2$ and transmits the Report signal repn_i+n at $\lambda 2$.

The other ONUs which has received the Gate signals g1_$i$ to gn-1_$i$ generate the Report signals rep1_$i$+1 to repn-1_$i$+1 again to transmit the Report signals to the OLT, and, thus, to transmit the uplink signals d1_$i$ to dn_$i$ at designated times, whereby the ONUs repeat a DWBA cycle. Meanwhile, the LC2 which has newly received the Report signal repn_$i$+1 at λ2 recognizes that the ONUn is newly added, performs bandwidth allocation calculation, and transmits the Gate signal gn_$i$+1 to the ONUn. The ONUn receives the Gate signal gn_$i$+1, switches the wavelength to λ2 at the designated time by gn_$i$+1, and transmits d2_$i$+1 that is the first uplink signal.

Here, the DWBA cycle T_dwba is represented by the following formula as with the DBA used in the multiple request method.

$$T\_dwba = T\_Rrep + T\_calc + T\_Sgate + T\_rt$$

In FIG. 2, the Gate signal to the ONUn includes the switching instruction from the wavelength λ1 to the wavelength λ2, and the ONUn receives the Gate signal, then starts to switch the wavelength, and after completion of switching of the wavelength, transmits a request signal to the LC2 at λ2. Accordingly, when the time required for switching is T_lmax, the maximum value of T_rt is represented by the following formula, using a propagation delay T_prop required for propagation to the ONU with a maximum distance.

$$T\_rt = 2T\_prop + T\_lmax$$

Namely, the cycle T_dwba of the related art dynamic wavelength bandwidth allocation is longer by the wavelength switching time T_lmax than the related art DBA.

Examples of a component for a wavelength tunable transceiver used in the ONU include a wavelength tunable using liquid crystal shown in Non Patent Literature 4, for example. Optical anisotropy is changed by controlling orientation of molecules of the liquid crystal in an electrical field, and transmission wavelength is changed. It takes time to control the orientation of the molecules, and a switching time from several milliseconds to several hundred milliseconds is generated. When it is assumed to apply such various wavelength tunable filters, in the T_rt the wavelength switching time may be dominant.

When the DWBA cycle becomes long accompanying switching of the wavelength, the following problem occurs.

As shown in FIG. 2, d1_$i$ and d2_$i$ as uplink signals allowed with respect to the Report signals rep1_$i$ and rep2_$i$ are received by the OLT in a cycle T_dwba_$i$+1. When the DWBA cycle becomes long, it is assumed that the time from when the ONU1 requests with rep1_$i$ till d1_$i$ that the ONU1 actually transmits an uplink signal is long in comparison with the dynamic bandwidth allocation in the related art TDM-PON shown in FIG. 1. Namely, since the time for which the uplink signal is accumulated in a buffer memory in the ONU, delay of the uplink signal increases. Since the amount of a buffer memory should be increased by increasing the DWBA cycle, the cost of the ONU is increased.

When the DWBA cycle becomes longer, the time that can be allocated to one ONU can be increased. For example, the time that the ONU1 can transmit as d1_$i$ in FIG. 2 can be made longer than that in the related art TDM-PON of FIG. 1 if the number of the ONUs is equal and a bandwidth is proportionally divided to each of the ONUs. Since the uplink signal is transmitted by the instruction of the OLT at the time when transmission can be performed, traffic of the ONU concentrates temporally, and burst characteristics are enhanced. For example, even when stationary traffic in which a frame length and a frame interval are small is input as an uplink signal to the ONU, the uplink signal transmitted from the ONU to the OLT may change to such traffic characteristics that the uplink signal is transmitted within the time of d1_$i$. Accordingly, as the DWBA cycle becomes longer, the uplink signals received by the ONU are collectively transmitted within a certain time, and the uplink signal is converted into the traffic characteristics with high burst characteristics.

In general, a transmissions system is required to suppress delay to prevent a user from affecting a terminal performing transmission and reception and perform transmission while maintaining the input traffic characteristics as possible. Accordingly, in terms of reduction of the delay and the maintenance of the traffic characteristics, the DWBA cycle is required to be reduced as short as possible.

Accordingly, when the dynamic wavelength bandwidth allocation using a fixed cycle such as the multiple request method is realized in wavelength tunable WDM/TDM-PON, a transmission delay of an uplink signal and an increase in the burst characteristics are suppressed. Namely, a wavelength switching method that can suppress an increase in an allocation cycle to a minimum is required.

Thus, in the present disclosure, a DBA cycle in which a transmission time and a transmission duration time of an uplink signal are allocated and a dynamic wavelength allocation cycle (DWA cycle) in which a wavelength of the uplink signal is allocated are separated. In the DBA cycle, an ONU requests a bandwidth of the uplink signal for each cycle, and in accordance with this, the OLT calculates a time when the OLT transmits the uplink signal and a transmission duration time and performs an instruction. The ONU transmits the uplink signal in accordance with the instruction. In the DWA cycle, the OLT instructs switching of the wavelength for each cycle, and the ONU switches the wavelength and belongs to a different LC.

While the ONU switches the wavelength, the DBA cycles can be performed plural times in the ONU whose wavelength is not switched, the switching of the wavelength is confirmed after the wavelength has been switched, and then DBA operation is performed at the switched wavelength.

An optical system of the present disclosure includes
a station-side apparatus switching a plurality of uplink wavelengths and performing transmission and reception while varying a wavelength, and
a plurality of subscriber apparatuses connected to the station-side apparatus in a PON topology, switching an uplink wavelength, and performing transmission and reception while varying a wavelength.

In this optical system, the station-side apparatus allocates, in accordance with a signal bandwidth request from the subscriber apparatus, an uplink wavelength and a bandwidth to the subscriber apparatus to prevent signals, transmitted from a plurality of the subscriber apparatuses, from colliding with each other, instructs, when wavelength allocation to the subscriber apparatus is not switched, a signal transmission start time and a transmission duration time to the subscriber apparatus for each predetermined cycle, instructs, when the wavelength allocation to the subscriber apparatus is switched, a new uplink wavelength to the subscriber apparatus, instructs the subscriber apparatus to transmit a wavelength switch completion report for reporting completion of switching of the wavelength at a new uplink wavelength, and waits for the wavelength switch completion report at the new uplink wavelength across a plurality of the predetermined cycles, and the subscriber apparatus requests an uplink signal bandwidth to the station-side apparatus for each of the predetermined cycles, transmits, when the station-side apparatus does not switch wavelength allocation, in accordance with an instruction of the signal transmission start time and the transmission duration time from the station-side apparatus without switching the uplink wavelength, switches, when the station-side apparatus switches the wavelength allocation, to the new uplink wavelength in accordance with the instruction of the station-side apparatus, and after completion of the switching of the wavelength, transmits a wavelength switch completion report at the new uplink wavelength.

A dynamic wavelength bandwidth allocation method for an optical system of the present disclosure is a dynamic wavelength bandwidth allocation method for an optical system which includes a station-side apparatus switching a plurality of uplink wavelengths and performing transmission and reception while varying a bandwidth, and a plurality of subscriber apparatuses connected to the station-side apparatus in a PON topology, switching the uplink wavelength, and performing transmission and reception while varying a bandwidth.

In this method, the subscriber apparatus requests an uplink signal bandwidth to the station-side apparatus for each of predetermined cycles, the station-side apparatus allocates, in accordance with a signal bandwidth request from the subscriber apparatus, an uplink wavelength and a bandwidth to the subscriber apparatus to prevent signals, transmitted from a plurality of the subscriber apparatuses, from colliding with each other, instructs, when wavelength allocation to the subscriber apparatus is not switched, a signal transmission start time and a transmission duration time to the subscriber apparatus for each predetermined cycle, instructs, when the wavelength allocation to the subscriber apparatus is switched, a new uplink wavelength to the subscriber apparatus, instructs the subscriber apparatus to transmit a wavelength switch completion report for reporting completion of switching of the wavelength at a new uplink wavelength, and waits for the wavelength switch completion report at the new uplink wavelength across a plurality of the predetermined cycles, and the subscriber apparatus transmits, when the station-side apparatus does not switch wavelength allocation, in accordance with an instruction of the signal transmission start time and the transmission duration time from the station-side apparatus without switching the uplink wavelength, switches, when the station-side apparatus switches the wavelength allocation, to the new uplink wavelength in accordance with the instruction of the station-side apparatus, and after completion of the switching of the wavelength, transmits a wavelength switch completion report at the new uplink wavelength.

A station-side apparatus of the present disclosure switches a plurality of uplink wavelengths, performs transmission and reception while varying a bandwidth, and is applied to an optical system of a PON topology.

The station-side apparatus allocates, in accordance with a signal bandwidth request from a subscriber apparatus, an uplink wavelength and the bandwidth to the subscriber apparatus to prevent signals, transmitted from a plurality of the subscriber apparatuses, from colliding with each other, instructs, when wavelength allocation to the subscriber apparatus is not switched, a signal transmission start time and a transmission duration time to the subscriber apparatus for each predetermined cycle, instructs, when the wavelength allocation to the subscriber apparatus is switched, a new uplink wavelength to the subscriber apparatus, instructs that the subscriber apparatus transmits a wavelength switch completion report for reporting completion of switching of the wavelength at a new uplink wavelength, and waits for the wavelength switch completion report at the new uplink wavelength across a plurality of the predetermined cycles.

A program of the present disclosure makes a computer function as a station-side apparatus of this disclosure. This program may be recorded in a computer readable recording medium.

According to the configuration of the present disclosure, it is possible to provide a wavelength tunable WDM/TDM-PON system which allows, when using a component in which the wavelength switching time is longer than a dynamic bandwidth allocation cycle determined when a wavelength is not switched, that is, the DBA cycle, transmission of the uplink signal with a low delay while maintaining traffic characteristics of the uplink signal input to the ONU to the same extent as those in the related art PON.

The station-side apparatus may allocate, from instructing the new uplink wavelength to the subscriber apparatus to receiving the wavelength switch completion report, an uplink wavelength and the bandwidth to other subscriber apparatuses except for the subscriber apparatus.

According to this constitution, the ONUs other than the ONU switching the wavelength can continue uplink signal transmission with high bandwidth utilization efficiency, using a dynamic bandwidth allocation method such as a multiple request method.

The station-side apparatus may repeat, after instructing the new uplink wavelength to the subscriber apparatus, instructing the subscriber apparatus to transmit the wavelength switch completion report at the new uplink wavelength for each of the predetermined cycles and wait for reception of the signal bandwidth request at the new uplink wavelength.

According to this constitution, completion of the wavelength switching procedure and the validity can be confirmed by exchanging Gate and Report. Even when the ONUs different in time are mixed, the wavelength switching time of the ONU is accurately specified, and a dynamic wavelength bandwidth allocation cycle is not required to be unified as a specification. The range of choice for components of the ONU associated with wavelength variability is widened, whereby economization of the ONU can be expected.

The station-side apparatus may further instruct, when instructing the new uplink wavelength to the subscriber apparatus, a time when an uplink signal accumulated in the subscriber apparatus is immediately transmitted, a transmission duration time and a time when the subscriber apparatus starts to switch to the new uplink wavelength.

According to this constitution, since the uplink signal accumulated in the ONU can be transmitted before switching of the wavelength, it is possible to reduce an increase in delay due to accumulation of signals that cannot be transmit during switching of the wavelength.

The station-side apparatus may repeat, after the time when the subscriber apparatus starts to switch to the new uplink wavelength instructed by the station-side apparatus, instructing the subscriber apparatus to transmit the wavelength switch completion report at the new uplink wavelength for each of the predetermined cycles and wait for reception of the signal bandwidth request at the new uplink wavelength.

According to this constitution, the completion of the wavelength switching procedure and the validity can be confirmed by using a Gate signal and a Report signal used in the DBA operation. Even when the ONUs different in switching time are mixed, the wavelength switching time of the ONU is accurately specified, and a dynamic wavelength bandwidth allocation cycle is not required to be unified as a specification. The range of choice for components of the ONU associated with wavelength variability is widened, whereby the technical innovation and economization of the ONU can be expected.

The above disclosures may be combined as much as possible.

Advantageous Effects of Disclosure

According to the present disclosure, when dynamic wavelength bandwidth allocation using a fixed cycle such as a multiple request method is realized in wavelength tunable WDM/TDM-PON, a transmission delay of an uplink signal and an increase in burst characteristics can be suppressed. Consequently, this disclosure can suppress an increase in an allocation cycle to a minimum.

DETAILED DESCRIPTION OF THE PREFERRED EMBODIMENT

Embodiments of the present disclosure will be described with reference to the accompanying drawings. The embodiments to be described hereinafter are examples of the present disclosure, and the present disclosure is not limited to the following embodiments. Those embodiments are merely examples and can be practiced in forms variously modified and improved based on the knowledge of those skilled in the art. Components denoted by the same reference numerals in the present specification and the drawings mutually denote the same components.

First Embodiment

Figure 3:
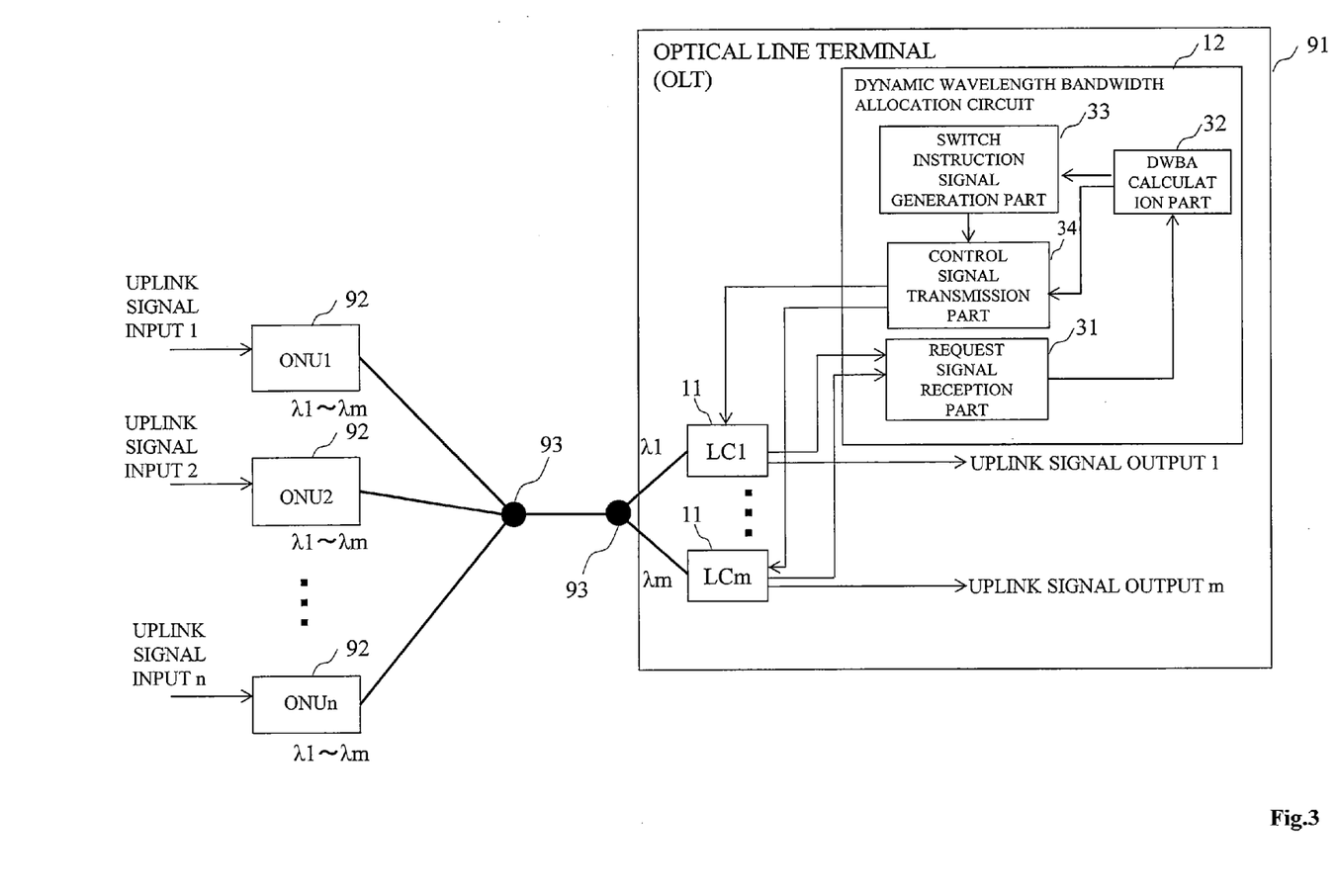
FIG. 3 is a configuration diagram of a wavelength tunable WDM/TDM-PON system of the present disclosure.

FIG. 3 shows a configuration diagram of a wavelength tunable WDM/TDM-PON system in the present disclosure and a station-side apparatus (OLT) and subscriber apparatuses (ONU) constituting this system. An OLT 91 and ONUs 92 are connected by a PON topology having a point-to-multipoint configuration using an optical multiplexing/demultiplexing circuit 93 such as a power splitter or a wavelength router.

The OLT 91 is connected to the n ONUs 92, that is, ONU1 to ONUn, and each of the ONUs 92 performs transmission and reception using wavelengths $\lambda 1$ to $\lambda m$. The ONU 92 can perform transmission and reception while switching the wavelengths $\lambda 1$ to $\lambda m$ in accordance with an instruction from the OLT 91. Each of the ONUs 92 receives an input of an uplink signal from a communication apparatus installed in a user's home, and the uplink signal is transmitted as an uplink optical signal by an optical transceiver in the ONU 92. Since the uplink signals are multiplexed in one optical fiber from the optical multiplexing/demultiplexing circuit 93 on the ONU 92 side toward the OLT 91, the OLT 91 calculates and controls a transmission time of the uplink signal transmitted from each of the ONUs 92 and a transmission duration time of the uplink signal to prevent the uplink signals from being superimposed.

The OLT 91 is constituted of line cards LC1 to LCm transmitting and receiving wavelengths $\lambda 1$ to $\lambda m$, respectively, and a dynamic wavelength bandwidth allocation circuit 12, and LC1 to LCm receive a signal of each wavelength transmitted from the ONU 92 and output the signals as uplink signals.

The dynamic wavelength bandwidth allocation circuit 12 is constituted of a DWBA calculation part 32, a switch instruction signal generation part 33, a control signal transmission part 34, and a request signal reception part 31. The request signal reception part 31 receives a Report signal transmitted from each of the ONUs 92 and including a bandwidth request through each of the LCs 11, the DWBA calculation part 32 calculates the transmission time and the transmission duration time of the uplink signal and the Report signal to be allocated to each of the ONUs 92 in accordance with the request, the switch instruction signal generation part 33 generates a Gate signal storing its information, and the control signal transmission part 34 transmits the Gate signal to each of the ONUs through each of the LCs.

Figure 4:
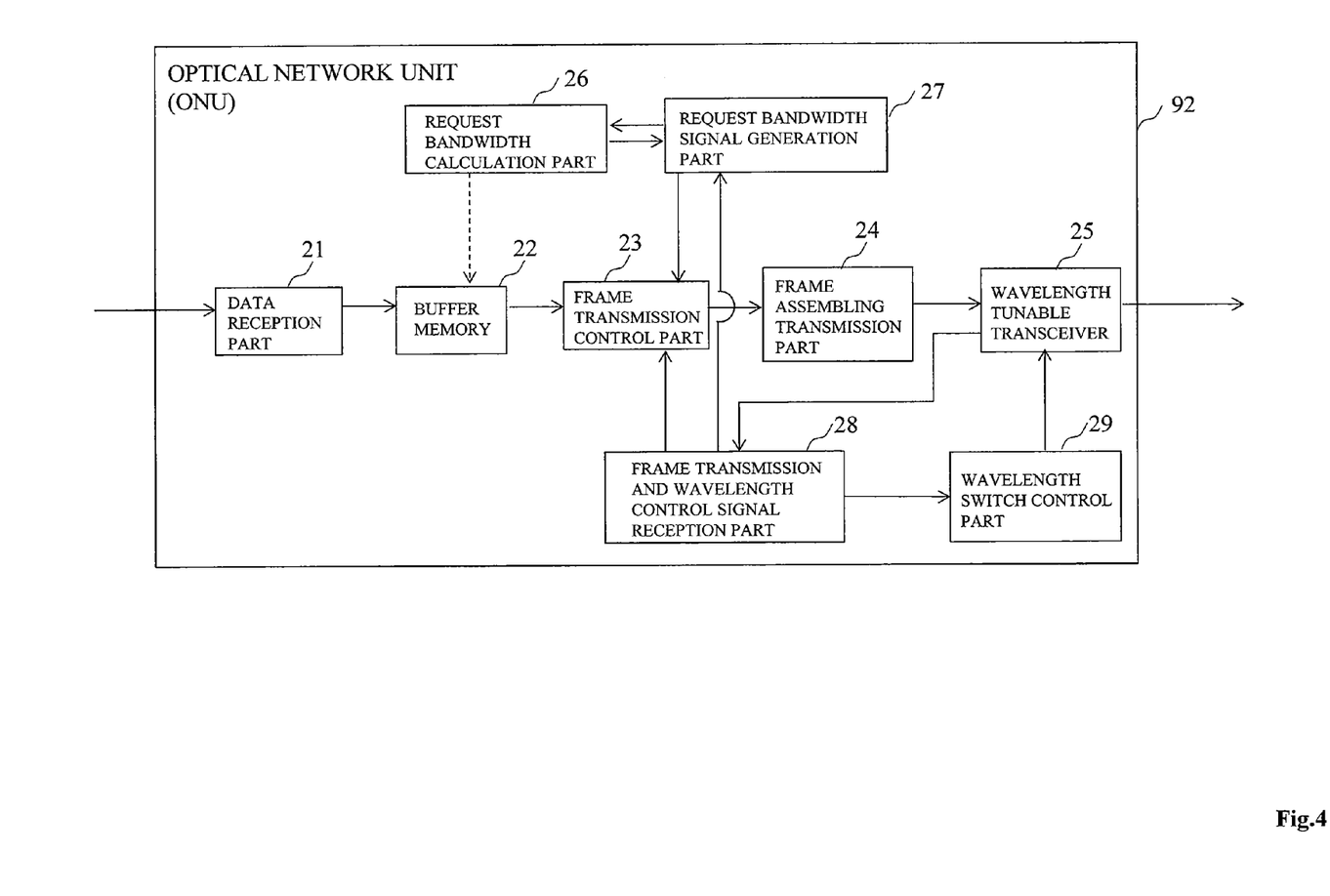
FIG. 4 is a configuration diagram of an ONU in the wavelength tunable WDM/TDM-PON system of the present disclosure.

FIG. 4 shows a configuration of the ONU 92. The ONU 92 is constituted of a data reception part 21, a buffer memory 22, a frame transmission control part 23, a frame assembling transmission part 24, a wavelength tunable optical transceiver 25, a request bandwidth calculation part 26, a request bandwidth signal generation part 27, a frame transmission and wavelength control signal reception part 28, and a wavelength switch control part 29.

The data reception part 21 receives an uplink signal from a user, and buffer memory 22 temporarily accumulates the uplink signal. The frame transmission control part 23 transmits the uplink signal to the frame assembling transmission part 24 in accordance with the transmission time and the transmission duration time of the uplink signal designated by a Gate signal. The frame assembling transmission part 24 constitutes a frame format required for transmitting a signal to the OLT 91 in a PON configuration and transmits the signal to the wavelength tunable optical transceiver 25. The wavelength tunable optical transceiver 25 converts the received signal into an optical signal with any one of wavelengths $\lambda 1$ to $\lambda m$ designated by the wavelength switch control part 29 and transmits the optical signal to the OLT 91.

The wavelength tunable optical transceiver 25 receives the Gate signal from the OLT 91 to convert the Gate signal into an electric signal, and, thus, to transmits the electric signal to the frame transmission and wavelength control signal reception part 28. The frame transmission and wavelength control signal reception part 28 analyzes an instruction of the Gate signal and, when the Gate signal include a wavelength switch instruction, a wavelength after switching, and a switch start time, sends a switching destination wavelength and a switching instruction to the wavelength switch control part 29 at a designated time. The wavelength switch control part 29 switches the wavelength of the wavelength tunable optical transceiver 25 in accordance with the wavelength switching control.

The Gate signal includes information for instructing that a bandwidth required by the ONU is transmitted as the Report signal from the ONU. The frame transmission and wavelength control signal reception part 28 which has received the Gate signal requesting transmission of the Report signal instructs the request bandwidth signal generation part 27 to generate the Report signal. The request bandwidth signal generation part 27 instructs the request bandwidth calculation part 26 to calculate the required bandwidth. The request bandwidth signal generation part 27 monitors and measures a data amount of an uplink signal accumulated in the buffer memory 22, determines a requested bandwidth amount based on the data amount, and transmits the requested bandwidth amount to the request bandwidth signal generation part 27. The request bandwidth signal generation part 27 generates the Report signal including a requested amount and transmits the Report signal to the frame transmission control part 23.

The Gate signal includes information on a transmission time and a transmission amount of the Report signal. The frame transmission and wavelength control signal reception part 28 transmits information on the transmission time and the transmission amount of the Report signal, included in the Gate signal, to the frame transmission control part 23. The frame transmission control part 23 transmits the Report signal to the frame assembling transmission part 24 at a designated time and transmits the Report signal to the OLT 91 through the wavelength tunable optical transceiver 25. The Gate signal transmitted from the OLT 91 includes the transmission time and the data amount of the uplink signal received by the ONU 92. The frame transmission and wavelength control signal reception part 28 transmits the information on the transmission time and the transmission amount of the uplink signal, included in the Gate signal, to the frame transmission control part 23. The frame transmission control part 23 takes a frame of the data amount that does not exceed the transmission amount from the buffer memory 22 to transmit the uplink signal to the frame assembling transmission part 24 at the designated time, and, thus, to transmit the Report signal to the OLT 91 through the wavelength tunable optical transceiver 25.

Next, operation of this embodiment will be described.

Figure 5:
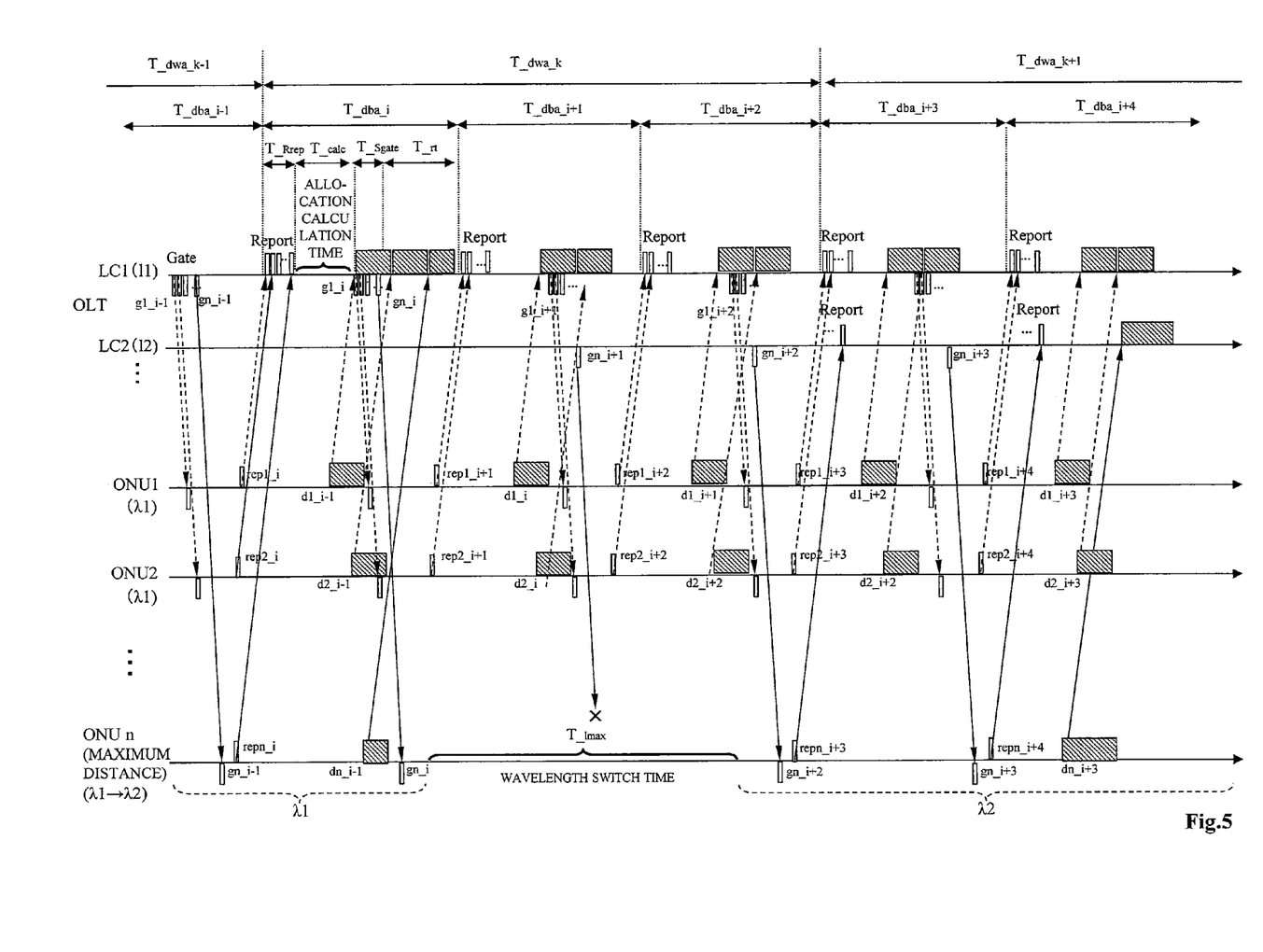
FIG. 5 is an uplink signal sequence in a dynamic wavelength bandwidth allocation method in a first embodiment.

FIG. 5 shows dynamic wavelength bandwidth allocation operation according to a first embodiment of the present disclosure in accordance with the format of FIGS. 1 and 2. A time of a k-th cycle in dynamic wavelength allocation is represented by T_dwa_k, and a time of an i-th cycle in dynamic bandwidth allocation (DBA) is represented by T_dba_i. T_dwa_k is set to multiple times the DBA cycle. In the example of FIG. 5, three DBA cycles correspond to one DWA (dynamic wavelength allocation) cycle.

The ONU belonging to the corresponding LC performs communication using each of the wavelengths λ1 to λm fixedly allocated to each of the LCs. In the embodiment of FIG. 5, in the DWA cycle T_dwa_k−1, it is assumed that the ONU1, the ONU2, and the ONUn perform communication using λ1 of the LC1. The respective ONUs which have received the Gate signals g1_i to gn_i−1 transmitted from the LC1 first transmits the Report signals rep1_i to repn_i to the OLT in accordance with the transmission time and the duration time of the Report signal and the uplink signal included in each of the Gate signals. The ONUs further transmit uplink signals d1_i−1 to dn_i−1.

The OLT 91 which has received the Report signals in DWA cycle T_dwa_k and DBA cycle T_dba_i calculates, in the dynamic wavelength bandwidth allocation circuit 12, the bandwidth and the wavelength allocated to each of the ONUs from the bandwidth requested by the Report signals. In the ONU 92 calculated so that the wavelength is not switched, the bandwidth allocation calculation result obtained in accordance with an arbitrary DBA calculation method is included in the Gate signal, and the instruction is given to the ONU 92.

In the example of this embodiment, the wavelength of the ONUn is changed from λ1 to λ2 based on the calculation result, and the change is performed so that the ONUn belongs to the LC2. In this case, the OLT 91 which has performed the allocation calculation includes, in the Gate signals g1_i to gn−1_i except for gn_i, the transmission time and the duration time of the Report signal and the uplink signal in the T_dba_i cycle and transmits the Gate signals. The uplink signal can be transmitted to the subsequent ONU1 to ONUn−1 based on the above-described operation of the DBA.

Meanwhile, the Gate signal gn_i with respect to the ONUn whose wavelength is to be switched is transmitted while including an instruction that the wavelength is switched to λ2. The ONUn whose wavelength is to be switched receives the Gate signal gn_i, confirms that the instruction to switch to the wavelength λ2 is included in the Gate signal, and then starts the wavelength switching operation described in FIG. 4. Although the wavelength switching time depends on the performance of a wavelength tunable component used in the ONU, the wavelength switching time is defined up to within T_lmax.

The OLT 91 has instructed the ONUn to switch the wavelength from λ1 to λ2 takes over the transmission of the Gate signal and the reception of the Report signal from the LC1 To LC2. After those operations have been taken over by the LC2, the LC2 calculates a transmission timing of the Report signal from the ONUn for each, DBA cycle until receiving the Report signal from the ONUn and repeats to transmit the Gate signal, including this instruction, to the ONUn. In FIG. 5, although the gate signal gn_i+1 is transmitted from the LC2, the ONUn is switching the wavelength, and the Gate signal is not received. Meanwhile, the transmission time and the transmission duration time of the uplink signal are not included in the calculation in the DBA until a wavelength switch completion report is received from the ONUn. This is because the ONUn cannot perform transmission and reception at λ2 at the time, the bandwidth of an uplink signal can be utilized as the bandwidth of another ONU belonging to the other LC2. Although it is generally considered that in the wavelength switch completion report from the ONUn, the Report signal includes wavelength completion information, for example, it can be regarded that a wavelength completion report is the fact that the bandwidth request using the Report signal, transmitted from the ONUn after completion of switching the wavelength, is received by the LC2.

After the completion of switching the wavelength of the ONUn, the ONUn can perform transmission and reception at λ2. In FIG. 5, the ONUn can receive a Gate signal gn_i+2. The ONUn transmits the Report signal repn_i+3 at λ2 in accordance with the transmission time and the transmission duration time of the Report signal included in the Gate signal. In this case, as in the DBA calculation, a request of uplink signal transmission permission is included in the Report signal repn_i+3, using the request bandwidth calculation part 26 and the request bandwidth signal generation part 27 of the ONUn. The OLT regards the reception of the Report signal repn_i+3 at λ2 as the wavelength switch completion report for reporting the completion of the switching of the wavelength of the ONUn, and information on the Report signal from the ONUn is included in the DBA calculation for the uplink signal belonging to the L2. The calculation result is included in the Gate signal gn_i+3 and transmitted to the ONUn, and the ONUn transmits an uplink signal dn_i+3 to the OLT in accordance with the transmission time and the transmission duration time included in the Gate signal.

Hereinabove, in this embodiment, a cycle ranging from the reception of rep1_i to repn_i to immediately before the reception of rep1_i+3 to repn_i+3 is one DWA cycle, and a wavelength switching sequence and a cycle are set. In this embodiment, although the wavelength switching sequence with respect to one ONU is exemplified, when an allocation calculation load in T_dba_i is low, or when a calculation capability of the dynamic wavelength bandwidth allocation circuit is sufficiently high, the wavelengths of a plurality of ONUs can be simultaneously changed within the DWA cycle.

A calculation timing of switching the wavelength is not always T_dba_i. After the Gate signal in the T_dba cycle at the head of the DWA cycle T_dwa has been transmitted, the ONU whose wavelength is to be switched may be determined until reaching a calculation time T_calc in the T_dba cycle at the head of the next DWA cycle T_dwa. However, with respect to the ONU whose wavelength is not switched, bandwidth allocation calculation is required to be performed in T_calc in each DBA cycle.

According to this embodiment, the following effects can be expected in comparison with the related art.

In this embodiment, in order to efficiently realize dynamic wavelength and bandwidth allocation of an uplink signal of the ONU even when the wavelength tunable component in the wavelength tunable WDM/TDM-PON system takes time to perform wavelength switching, all the calculations are not performed every time for each DBA cycle, the time when the OLT transmits the uplink signal and the transmission duration time are calculated, and the DBA cycle in which the ONU transmits the uplink signal in accordance with the instruction and the DWA cycle in which the OLT instructs the wavelength switching, the ONU switches the wavelength and newly requests the transmission permission of the uplink signal to another LC are separated. While the ONU switches the wavelength, a plurality of the DBA cycles can be performed by the ONU whose wavelength is not switched, and the ONU whose wavelength is switched confirms the switching of the wavelength after the wavelength has been switched and then performs DBA operation at the switched wavelength. According to this constitution, when a component in which the wavelength switching time is longer than the DBA cycle is used in the ONU, even if a dynamic wavelength bandwidth allocation method performed in a fixed cycle is used, an increase in delay due to lengthening of the bandwidth allocation cycle can be suppressed.

Even during switching of the wavelength, the ONU whose wavelength is not switched continues the DBA operation. Consequently, even if the wavelength of a certain ONU is being switched, in the ONU whose wavelength is not switched, uplink signal transmission in which bandwidth utilization efficiency is high and delay is suppressed can be continued using the existing DBA method such as the multiple request method.

In the ONU whose wavelength is switched, after the wavelength has been switched, completion of the wavelength switching procedure and the validity can be confirmed by exchanging the Gate signal and the Report signal as the related art DBA operation. Consequently, since confirmation behavior relating to the switching of the wavelength is performed by transmission and reception of a control frame in the dynamic bandwidth allocation in the existing TDM-PON, a new procedure for confirming the switching of the wavelength is not required to be added, and thus it is efficient.

For simplicity of mounting, the maximum value T_lmax is defined, and although it is described in this embodiment that the DWA cycle is multiple times the DBA cycle, the DWA operation can be performed even if limitation and fixation with respect to the DWA cycle are not performed, except that the DWA cycle is multiple times the DBA cycle. Accordingly, even when the ONUs different in the wavelength switching time are mixed, the wavelength switching time of the ONU is accurately specified, and a dynamic wavelength bandwidth allocation cycle is not required to be strictly unified as a specification. Namely, the range of choice for components of the ONU associated with wavelength variability is widened, whereby the technical innovation and economization of the ONU can be expected. Further, during switching of the wavelength, the transmission start time and the transmission duration time of the uplink signal are not instructed to the ONU whose wavelength is switched. Accordingly, when a buffer memory of the ONU has a capacity enough to accumulate the uplink signal for not less than the wavelength switching time, the uplink signal is accumulated in the buffer memory, and a frame loss of the uplink signal due to the wavelength switching operation can be avoided.

In this specification, for ease of understanding, although there has been described the case where the time of the i-th cycle of the DBA is a fixed value, the present disclosure is not limited thereto. Even when the time of the i-th cycle of the DBA varies, there occurs a problem that T_lmax in FIG. 5 is larger than T_dba_i. In the present disclosure, even in such a case, the problem can be solved by switching the wavelength across a plurality of DBA cycles. Namely, T_dwa_k that is sufficiently longer than T_lmax is secured across not less than the plurality of DBA cycles, and when there is a period long enough to receive the wavelength switch completion report, even if the DBA allocation cycle following T_dba_i+1 in FIG. 5 varies, or even if T_dwa_k, that is, the DWA cycle varies, the switching of the wavelength can be completed by the procedure proposed in this embodiment.

Second Embodiment

Figure 6:
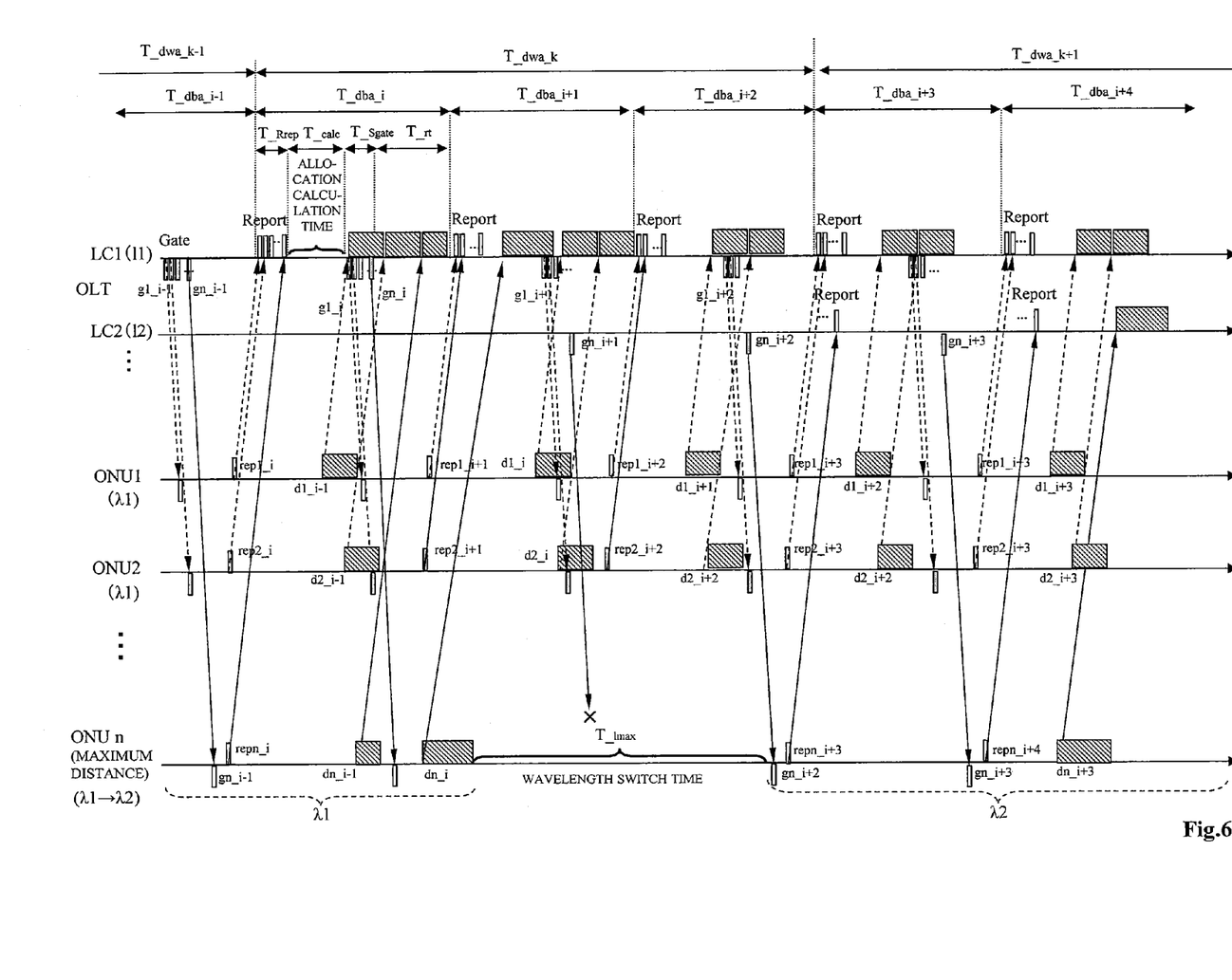
FIG. 6 is an uplink signal sequence in a dynamic wavelength bandwidth allocation method in a second embodiment.

FIG. 6 shows a second embodiment of the present disclosure in accordance with the format of FIG. 5. An OLT and an ONU have the same configurations as those in FIGS. 3 and 4. A method of describing operation and basic operation in FIG. 6 are substantially similar to those of the first embodiment. Also in the example of this embodiment, the wavelength of an ONUn is changed from λ1 to λ2 based on a calculation result, and change is performed so that the ONUn belongs to an LC2.

This embodiment is different from the first embodiment in the DBA calculation with respect to the ONUn whose wavelength is switched, the information included in the Gate signal gn_i, the operation of the ONUn in the DWA cycle T_dwa_k and the DBA cycle T_dba_i.

A dynamic wavelength bandwidth allocation circuit 12 which calculates that the wavelength of the ONUn is changed from λ1 to λ2 by a Report signal received in the DBA cycle T_dba_i gives the highest priority to the ONUn in the transmission of the uplink signal in this cycle. More specifically, scheduling is performed so that an uplink signal dn_i of the ONUn is first received in a DBA cycle T_dba_i+1.

The Gate signal gn_i includes an instruction of switching to the wavelength λ2, a transmission time of the uplink signal dn_i, and a transmission duration time and is transmitted to the ONUn. The ONUn whose wavelength is switched receives the Gate signal gn_i, confirms that an instruction to switch to the wavelength λ2 is included in the Gate signal, transmits the uplink signal dn_i at λ1, and then starts the wavelength switching operation described in FIG. 4.

In comparing the operation in this embodiment with the related art, the operation in this embodiment is similar to that in the first embodiment. In addition, the following effects can be expected in this embodiment.

In the first embodiment, after the Report signal repn_i used for the ONUn to request the bandwidth has been transmitted, the uplink signal in which data is actually transmitted is dn_i+3. Namely, data accumulated from repn_i−1 to repn_i is waited for not less than one DWA cycle at worst, and delay increases.

In this embodiment, since the operation of switching the wavelength is performed after the uplink signal with respect to the Report signal repn_i has been first transmitted, the data accumulated from repn_i−1 to repn_i can be transmitted in the DBA cycle T_dba_i+1, and there is an effect to reduce an increase in delay generated by the switching of the wavelength.

In the first and second embodiments, as an access method using an optical fiber, the method of sorting bandwidth allocation of the uplink signal of the PON topology into the wavelength and the time and transmitting the uplink signal has been described. However, the present disclosure can be applied to wireless communication as a similar for.

INDUSTRIAL APPLICABILITY

A dynamic wavelength bandwidth allocation system, a circuit, a program, and a recording medium recording this program, according to the present disclosure can provide, in wavelength tunable WDM/TDM-PON, a dynamic wavelength bandwidth allocation method which can effectively allocate a total bandwidth of a plurality of wavelengths to each ONU to suppress an increase in an average delay due to bandwidth allocation and reduce the cost of the ONU.

REFERENCE SIGNS LIST

11: LC
12: dynamic wavelength bandwidth allocation circuit
21: data reception part
22: buffer memory
23: frame transmission control part
24: frame assembling transmission part
25: wavelength tunable transceiver
26: request bandwidth calculation part
27: request bandwidth signal generation part
28: frame transmission and wavelength control signal reception part
29: wavelength switch control part
31: request signal reception part
32: DWBA calculation part
33: switch instruction signal generation part
34: control signal transmission part
91: OLT
92: ONU
93: optical multiplexing/demultiplexing circuit

The invention claimed is:

1. A station-side apparatus switching a plurality of uplink wavelengths, performing transmission and reception while varying a bandwidth, and applied to an optical system of a PON topology,
the station-side apparatus allocating, in accordance with a signal bandwidth request from a subscriber apparatus, an uplink wavelength and the bandwidth to the subscriber apparatus to prevent signals, transmitted from a plurality of the subscriber apparatuses, from colliding with each other, instructing, when wavelength allocation to the subscriber apparatus is not switched, a signal transmission start time and a transmission duration time to the subscriber apparatus for each predetermined cycle, instructing, when the wavelength allocation to the subscriber apparatus is switched, a new uplink wavelength to the subscriber apparatus, instructing that the subscriber apparatus transmits a wavelength switch completion report for reporting completion of switching of the wavelength at a new uplink wavelength, and waiting for the wavelength switch completion report at the new uplink wavelength across a plurality of the predetermined cycles.

2. The station-side apparatus according to claim 1, allocating, from instructing the new uplink wavelength to the subscriber apparatus to receiving the wavelength switch completion report, an uplink wavelength and the bandwidth to other subscriber apparatuses except for the subscriber apparatus.

3. The station-side apparatus according to claim 1 or 2, repeating, after instructing the new uplink wavelength to the subscriber apparatus, instructing the subscriber apparatus to transmit the wavelength switch completion report at the new uplink wavelength for each of the predetermined cycles and waiting for reception of the signal bandwidth request at the new uplink wavelength.

4. The station-side apparatus according to claim 1 or 2, instructing, when instructing the new uplink wavelength to the subscriber apparatus, a time when an uplink signal accumulated in the subscriber apparatus is immediately transmitted, a transmission duration time and a time when the subscriber apparatus starts to switch to the new uplink wavelength.

5. The station-side apparatus according to claim 4, repeating, after the time when the subscriber apparatus starts to switch to the new uplink wavelength instructed by the station-side apparatus, instructing the subscriber apparatus to transmit the wavelength switch completion report at the new uplink wavelength for each of the predetermined cycles and waiting for reception of the signal bandwidth request at the new uplink wavelength.

6. An optical system, comprising:
a station-side apparatus switching a plurality of uplink wavelengths and performing transmission and reception while varying a wavelength; and
a plurality of subscriber apparatuses connected to the station-side apparatus in a PON topology, switching an uplink wavelength, and performing transmission and reception while varying a wavelength,
wherein the station-side apparatus allocates, in accordance with a signal bandwidth request from the subscriber apparatus, an uplink wavelength and a bandwidth to the subscriber apparatus to prevent signals, transmitted from a plurality of the subscriber apparatuses, from colliding with each other, instructs, when wavelength allocation to the subscriber apparatus is not switched, a signal transmission start time and a transmission duration time to the subscriber apparatus for each predetermined cycle, instructs, when the wavelength allocation to the subscriber apparatus is switched, a new uplink wavelength to the subscriber apparatus, instructs the subscriber apparatus to transmit a wavelength switch completion report for reporting completion of switching of the wavelength at a new uplink wavelength, and waits for the wavelength switch completion report at the new uplink wavelength across a plurality of the predetermined cycles, and the subscriber apparatus requests an uplink signal bandwidth to the station-side apparatus for each of the predetermined cycles, transmits, when the station-side apparatus does not switch wavelength allocation, in accordance with an instruction of the signal transmission start time and the transmission duration time from the station-side apparatus without switching the uplink wavelength, switches, when the station-side apparatus switches the wavelength allocation, to the new uplink wavelength in accordance with the instruction of the station-side apparatus, and after completion of the switching of the wavelength, transmits a wavelength switch completion report at the new uplink wavelength.

7. The optical system according to claim 6, wherein the station-side apparatus allocates, from instructing the new uplink wavelength to the subscriber apparatus to receiving the wavelength switch completion report, the uplink wavelength and the bandwidth to other subscriber apparatuses except for the subscriber apparatus.

8. The optical system according to claim 6 or 7, wherein the station-side apparatus repeats, after instructing the new uplink wavelength to the subscriber apparatus, instructs the subscriber apparatus to transmit the wavelength switch completion report at the new uplink wavelength for each of the predetermined cycles and waits for reception of the signal bandwidth request at the new uplink wavelength.

9. The optical system according to claim 6 or 7, wherein the station-side apparatus further instructs, when instructing the new uplink wavelength to the subscriber apparatus, a time when an uplink signal accumulated in the subscriber apparatus is immediately transmitted, a transmission duration time and a time when the subscriber apparatus starts to switch to the new uplink wavelength.

10. The optical system according to claim 9, wherein the station-side apparatus repeats, after the time when the subscriber apparatus starts to switch to the new uplink wavelength instructed by the station-side apparatus, instructing the subscriber apparatus to transmit the wavelength switch completion report at the new uplink wavelength for each of the predetermined cycles and waits for reception of the signal bandwidth request at the new uplink wavelength.

11. A dynamic wavelength bandwidth allocation method for an optical system, the optical system including a station-side apparatus, which switches a plurality of uplink wavelengths and performs transmission and reception while varying a bandwidth, and a plurality of subscriber apparatuses connected to the station-side apparatus in a PON topology, switching the uplink wavelength, and performing transmission and reception while varying a bandwidth, wherein the method comprises:

requesting an uplink signal band width to the station-side apparatus for predetermined cycle, allocating, in accordance with a signal bandwidth request from the subscriber apparatus, an uplink wavelength and a bandwidth to the subscriber apparatus to prevent signals, transmitted from a plurality of the subscriber apparatuses, from colliding with each other, instructing, when wavelength allocation to the subscriber apparatus is not switched, a signal transmission start time and a transmission duration time to the subscriber apparatus for each predetermined cycle, instructing when the wavelength allocation to the subscriber apparatus is switched, a new uplink wavelength to the subscriber apparatus, instructing the subscriber apparatus to transmit a wavelength switch completion report for reporting completion of switching of the wavelength at a new uplink wavelength, and waiting for the wavelength switch completion report at the new uplink wavelength across a plurality of the predetermined cycles, and transmitting, when the station-side apparatus does not switch wavelength allocation, in accordance with an instruction of the signal transmission start time and the transmission duration time from the station-side apparatus without switching the uplink wavelength, switching, when the station-side apparatus switches the wavelength allocation, to the new uplink wavelength in accordance with the instruction of the station-side apparatus, and transmitting a wavelength switch completion report at the new uplink wavelength after completion of the switching of the wavelength.

12. The dynamic wavelength bandwidth allocation method for an optical system according to claim 11, wherein the method comprises:

allocating, from instructing the new uplink wavelength to the subscriber apparatus to receiving the wavelength switch completion report, the uplink wavelength and the bandwidth to other subscriber apparatuses except for the subscriber apparatus.

13. The dynamic wavelength bandwidth allocation method for an optical system according to claim 11 or 12, wherein the method further comprises, after instructing the new uplink wavelength to the subscriber apparatus:

repeating the instructing the subscriber apparatus to transmit the wavelength switch completion report at the new uplink wavelength, for each of the predetermined cycles, and waiting for reception of the signal bandwidth request at the new uplink wavelength.

14. The dynamic wavelength bandwidth allocation method for an optical system according to claim 11 or 12, wherein the method comprises:

further instructing, when instructing the new uplink wavelength to the subscriber apparatus, a time when an uplink signal accumulated in the subscriber apparatus is immediately transmitted, a transmission duration time and a time when the subscriber apparatus starts to switch to the new uplink wavelength.

15. The dynamic wavelength bandwidth allocation method for an optical system according to claim 14, wherein the method further comprises, after the time when the subscriber apparatus starts to switch to the new uplink wavelength instructed by the station-side apparatus:

repeating the instructing the subscriber apparatus to transmit the wavelength switch completion report at the new uplink wavelength, for each of the predetermined cycles, and waiting for reception of the signal bandwidth request at the new uplink wavelength.

\* \* \* \* \*